United States Patent Office 3,150,691
Patented Sept. 29, 1964

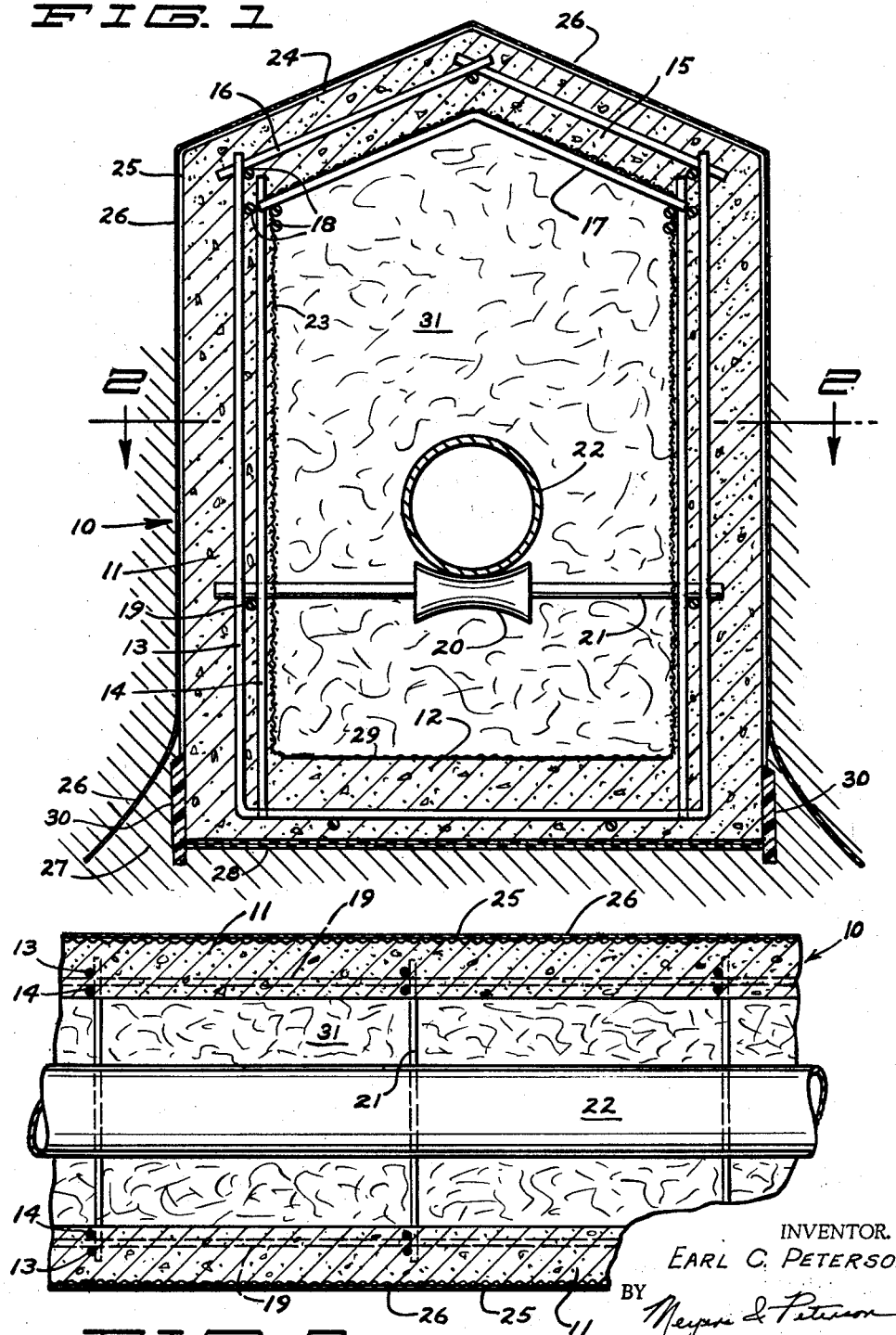

3,150,691
UNDERGROUND SELF-DRYING CONDUIT
Earl C. Peterson, Minneapolis, Minn., assignor to Permaduc, Inc., Minneapolis, Minn., a corporation of Minnesota
Filed Apr. 2, 1962, Ser. No. 184,255
6 Claims. (Cl. 138—105)

This invention relates to underground pipe conduits for housing pipes, adapted to carry fluids at elevated temperatures, and more particularly, to a conduit structure which allows escapement of moisture vapors outwardly therethrough and prevents re-entry of moisture into the interior thereof.

Many types of prior art conduit structures for housing pipes, susceptible to thermal change, have been proposed. One such structure is that set forth in my patent on Duct Structure for Pipes, Patent No. 2,906,294, issued September 29, 1959. Since the pipes housed within the conduit are often steam lines, it is not uncommon that small leaks in the pipe walls will develop which release steam vapors. If the pipes are maintained at a sufficiently high temperature, any water, which is allowed to accumulate in the conduit, will be readily evaporated so that it also will exist in the form of vapor.

When the conduits are constructed with cement, there is a natural tendency for the moisture or vapors to migrate through the conduit walls from the warm side to the cold side, the cold side often being at a temperature near or below the dew point of the vapor. The moisture thereafter condenses and gives rise to free water. Under certain conditions, the temperature of portions of the wall may be below the dew point of the vapors migrating therethrough, and condensation will then occur internally of the wall.

Existing conduit structures often utilize a vapor barrier, which is an impervious material that lines the inside surface of the conduit. Such a vapor barrier prevents moisture from migrating outwardly through the walls and ultimately causing condensation within the wall, thus perpetuating a damp condition which can corrode metal pipes and construction material. With the moisture trapped within the conduit, any insulation packing surrounding the pipes will become saturated with moisture and thus allow substantial heat transfer and loss from the pipes to the conduit walls. If the pipes are carrying pressurized steam for building heating purposes, it will be recognized that the efficiency of the heating system will be decreased considerably. An object of this invention, therefore, is to provide an improved conduit structure which will allow ready removal of moisture vapors from within the conduit in a manner that is not harmful to the conduit structure itself.

More specifically, an object of this invention is to provide an underground concrete conduit structure for housing pipes carrying thermally elevated fluids, wherein an impervious vapor barrier is positioned in such a manner that moisture will be allowed to migrate outwardly only through the conduit walls.

Another object is to provide a conduit structure as set forth above which utilizes, on the outer surface thereof, a means to aid the runoff of condensed water vapors after the migration thereof outwardly through the walls.

A further object is to provide a structure as set forth above which is simple in design and construction, yet highly effective in maintaining the inside of the conduit substantially free of water and water vapors, or in drying out water accidently released in the conduit without the necessity of tearing down the affected portions of the conduit or removing wet insulation therefrom.

These and other objects and advantages of my invention will more fully appear from the following description, made in connection with the accompanying drawing, wherein like reference characters refer to the same or similar parts throughout the several views and in which:

FIGURE 1 is an end cross sectional view of a conduit, which employs the structural principles of this invention; and FIGURE 2 is a reduced size cross sectional top view of FIGURE 1 taken on line 2—2.

The conduit, referred to generally as 10, employs a basic enclosing wall construction which is somewhat similar to that set forth in the above-referred-to patent on Duct Structure for Pipes. Positioned within the cement side wall 11 and traversing the bottom wall 12 (also of cement), is a U-shaped support rod 13. Located adjacent the support rod is a vertically oriented side rod 14, which is also partially embedded in the bottom wall 12. Both of the rods 13 and 14 extend upwardly into the top wall 15 where they join with a roof support rod 16 and a beam rod 17, respectively. Longitudinal brace rods 18 are also shown secured to the joinder of the rods 13 and 16, as well as 14 and 17.

As seen in both FIGURES 1 and 2, a longitudinal shaft support rod 19 is positioned between rods 13 and 14. This rod adds structural support in addition to an initial supporting means for the roller 20 and roller shaft 21. Once the cement walls 11 are solidified, however, the cement itself will support the roller shaft, thereby giving the required support for a pipe line 22.

Referring to FIGURE 1, the inside of the duct is provided with screen material or metal lath 23, which gives added structural reinforcement to the inside surface of the conduit. The perforate nature of the metal lath allows moisture within the conduit to pass therethrough prior to its migration through the walls toward the cooler outer surfaces 24 and 25, respectively, of the top wall 15 and side wall 11.

As more clearly seen in FIGURE 2, the outer surfaces 25 of the side walls are provided with a transversely corrugated configuration. The corrugated configuration is one of the important aspects of this invention, since the corrugations, which are formed down the side of the wall, provide a drainage means for condensed water vapors that have migrated outwardly through the wall. This deliberate irregularity, which may quite easily be formed with a toothed trowel, for example, not only provides a means for running off the water but also prevents a sealed bond from forming between the wall surface 25 and a non-pervious web 26, which completely encloses the top wall 15 and side walls 11.

The non-pervious web or vapor barrier 26, suitably of a polyethylene material because of its chemical inertness, as well as its durability and flexibility, is draped over the conduit prior to coverage thereof with earth. Once covered over, the low earthen temperatures will be readily conducted through the web 26 and tend to bring the temperature on the inside of the vapor barrier down to or near the dew point of water vapor dependent, of course, upon the season of the year and the depth of the conduit below the earth's surface. Since the internal cavity of the conduit is maintained at an elevated temperature because of the heat radiation from the pipe line 22, some temperature will be transferred outwardly through the walls thus to prevent condensation or even freezing of the water vapors before they reach the outer wall surfaces 24 and 25. With the inside surface of the web 26 at a low temperature, vapors migrating through the walls and reaching the corrugated surfaces will be there condensed, the condensation then being allowed to freely drain downwardly to the soil at 27 near the bottom of the conduit. In this area the web flares away from, and to a point below, the conduit so as to provide a large volume of earth for absorption of the drainage from the walls.

As seen in FIGURE 1, the bottom wall 12 is positioned on a double thickness of vapor barrier 28, and the top surface 29 is formed without the use of metal lath. An asphalt mastic barrier 30 is secured to the lower edges of each side 25 and extends downwardly thereof to isolate the saturated soil at 27 from the vapor barrier 28, thus preventing water seepage between the vapor barrier 28 and bottom wall 12.

It is noted that very often, conduits are completely sealed with asphaltic mastic or similar substances. However, it has been found that this sealing prevents the free flow drainage of the condensed water vapor which the applicant's corrugated surface, in cooperation with the web 26, allows.

As indicated previously, the conduit is normally packed with insulation that surrounds the pipes and fills the entire free space within the conduit. In the present case, well packed noncorrosive glass fiber insulation 31 is preferably utilized for it will readily allow migration of vapors therethrough from the pipe 22 toward the walls whereafter the vapors will pass through the metal lath 23 and then migrate through the cement of the walls to the outer surfaces. It may also be pointed out that the cement will preferably be of a porous nature also thereby to more readily allow the vapors to migrate outwardly therethrough.

Although the outer surfaces 24 and 25 of the top and side walls, respectively, have been found to serve quite adequately as a drainage means when corrugated through the use of the teeth of a tooth edged trowel, it is understood that any means by which the web is held outwardly from the walls sufficiently to allow drainage of condensation in a downwardly direction will suffice. For example, an extremely rough surface will suffice as will a surface covered with small nodules.

It will, of course, be understood that various changes may be made in the form, details, arrangements, and proportions of the parts without departing from the scope of my invention as set forth in the appended claims.

What is claimed:

1. A pipe conduit for housing pipe lines carrying fluids, the temperature of the fluid being substantially warmer than the temperature at the outer surface of said conduit, said conduit comprising:
   (a) a vapor pervious cement enclosing wall adapted to house a pipe line;
   (b) a non-porous web partially covering the outer surface of said enclosing wall; and
   (c) the outer surface of said enclosing wall being provided with a corrugated surface for a substantial portion thereof whereby to maintain said web in a spaced relation to said outer surface of said enclosing wall and defining therewith a downwardly directed opening to thus allow condensation collecting thereon to freely drain downwardly to escape said pipe conduit.

2. An underground pipe conduit for housing pipe lines carrying fluids, the temperature of the fluid being substantially warmer than the temperature at the outer surface of the conduit, said conduit comprising:
   (a) a relatively porous cement enclosing wall adapted to house a pipe line;
   (b) a non-porous web covering a substantial portion of the surface of said enclosing wall; and
   (c) the outer surface of said enclosing wall being provided with a downwardly directed corrugated surface for a substantial portion thereof to maintain said web in a spaced relation to said outer surface of said enclosing wall, said web and said downwardly directed corrugated surface defining a lower discharge opening whereby to allow migrated vapors from within said conduit to the outer corrugated surface to condense and freely drain downwardly to escape said pipe conduit.

3. An underground pipe conduit for housing pipe lines carrying fluids, the temperature of the fluids being substantially warmer than the temperature at the outer surface of the conduit, said conduit comprising:
   (a) a relatively porous cement enclosing wall adapted to house a pipe line;
   (b) said enclosing wall having a metal lath reinforcing structure which will allow moisture vapors to escape therethrough;
   (c) the outer surface of said enclosing wall being provided with a downwardly directed corrugated surface for a substantial portion thereof; and
   (d) a non-porous web covering a substantial portion of said corrugated surface to form downwardly directed passageways terminating in a drainage opening means, said web being adapted to be held in overlying relation with respect to said corrugated surface by surrounding earth.

4. An underground pipe conduit for housing a pipe line carrying fluids, the temperature of the fluids being substantially warmer than the temperature externally of the conduit, said conduit comprising:
   (a) a vapor pervious cement enclosing wall adapted to house a pipe line;
   (b) said enclosing wall having integral top and side walls reinforced with porous metal lath;
   (c) said top and side walls further being provided with transversely corrugated outer surfaces;
   (d) said enclosing wall further having a bottom wall for supporting said top and side walls;
   (e) a non-corrosive insulation material packed within said enclosing wall and adapted to surround a pipe line contained therein;
   (f) a means adapted for supporting said pipe line within said conduit and in spaced relation to the walls thereof; and
   (g) a non-porous web covering said top wall and extending downwardly along the side walls to a point below said bottom wall, the lower portion of said non-porous web being flared away from said conduit, whereby said corrugated outer surfaces of said top and side walls will hold said web outwardly therefrom and in spaced relation whence to permit free drainage of condensed moisture vapors collected in said corrugations.

5. A pipe conduit for housing pipe lines carrying fluids, the temperature of the fluids being substantially warmer than the temperature at the outer surface of said conduit, said conduit comprising:
   (a) a moisture vapor pervious enclosure having a wall structure defining side walls and a top wall interconnected thereacross;
   (b) a substantially moisture impervious web overlying the outer surfaces of said top and side walls; and
   (c) means for maintaining said web in a spaced relation to said outer surfaces of said top and side walls and defining therewith a downwardly directed opening, whereby the vapors present within the conduit, when allowed to migrate from the warmer inside of said wall to the cooler outside, will be allowed to condense and freely drain downwardly through said opening to escape the pipe conduit.

6. An underground pipe conduit for housing pipe lines carrying fluids, the temperature of the fluids being substantially warmer than the temperature at the outer surface of the conduit, said conduit comprising:
   (a) a relatively porous cement enclosing wall adapted to house a pipe line;
   (b) a non-porous web covering a substantial portion of the surface of said enclosing wall; and
   (c) means including a plurality of elongated downwardly directed channels disposed along a substantial portion of the outer surface of said enclosing wall to maintain said web in a spaced relation to said outer surface, said web and said downwardly directed channels defining a plurality of lower discharge openings whereby to allow migration of vapors from within said conduit to the outer surface to condense and freely drain downwardly to escape said pipe conduit.

References Cited in the file of this patent

UNITED STATES PATENTS

| | | |
|---|---|---|
| 1,797,443 | Powell | Mar. 24, 1931 |
| 2,311,572 | Reynolds | Feb. 16, 1943 |
| 2,311,573 | Shoan | Feb. 16, 1943 |
| 2,804,657 | Munters | Sept. 3, 1957 |
| 2,906,294 | Peterson | Sept. 29, 1959 |
| 3,045,707 | Loper | July 24, 1962 |